United States Patent

[11] 3,612,440

| [72] | Inventor | Richard A. Strong<br>6106 Hope Drive, Washington, D.C. 20031 |
|---|---|---|
| [21] | Appl. No. | 855,084 |
| [22] | Filed | Sept. 4, 1969 |
| [45] | Patented | Oct. 12, 1971 |

[54] WARP ACTION SPOILER PLATE AILERON AND COMBINED AIRPLANE AND AUTOMOBILE
9 Claims, 6 Drawing Figs.

| [52] | U.S. Cl. | 244/2 |
|---|---|---|
| [51] | Int. Cl. | B64c 37/00 |
| [50] | Field of Search | 244/2, 7, 49, 40, 41, 45, 90 |

[56] References Cited
UNITED STATES PATENTS

| 2,174,542 | 10/1939 | Weick | |
|---|---|---|---|
| 2,402,118 | 6/1946 | Ashkenas | 244/90 A |
| 2,573,271 | 10/1951 | Perl | 244/90 A |
| 2,609,167 | 9/1952 | Gero, Jr. | 244/2 |
| 2,811,323 | 10/1957 | Rethorst | 244/2 X |
| 2,812,911 | 11/1957 | De Jean | 244/2 |
| 2,940,688 | 6/1960 | Bland | 244/49 |
| 3,012,737 | 12/1961 | Dodd | 244/2 |
| 3,439,890 | 4/1969 | Stits | 244/2 |
| 1,749,769 | 3/1930 | Johnson | 244/49 |
| 2,539,489 | 1/1951 | Smith | 244/49 |
| 2,673,047 | 3/1954 | Scarato | 244/2 |
| 3,056,564 | 10/1962 | Zuck | 244/49 |
| | | | 244/2 |

*Primary Examiner*—Milton Buchler
*Assistant Examiner*—Carl A. Rutledge
*Attorney*—Gustave Miller ABSTRACT: The invention relates to an aircraft having roadability features and includes wing structures which fold from operative positions to inoperative positions nested within the body of the aircraft.

The wing has a warp action spoiler plate aileron in it and has a full span flap which, with the wing, may be swung into overlapping position in the fuselage with the other wing similarly positioned. It is an improvement on my prior U.S. Pat. No. 2,923,494 of Feb. 2, 1960.

INVENTOR
Richard A. Strong
BY Gustave Miller
ATTORNEY

PATENTED OCT 12 1971 3,612,440

INVENTOR
Richard A. Strong

BY *Gustav Miller*

ATTORNEY

WARP ACTION SPOILER PLATE AILERON AND COMBINED AIRPLANE AND AUTOMOBILE

BACKGROUND OF THE INVENTION

A difficulty found in combination aircraft-automobile structures has been the attachment of the wings to the fuselage. The necessity for folding or detachment of the wings so that the overall width of the vehicle be reduced for road travel presents many problems. Complete detachment and storage of the wings has been previously proposed but is not satisfactory, as it requires return of the vehicle to where the wings are stored before the vehicle may again become airborne.

Other proposals to fold the wings upward are also unsatisfactory for the reasons that the folded wings impede access to the passenger compartment and are highly susceptible to wind action when the vehicle travels on the road.

OBJECTS OF THE INVENTION

An object of the present invention is to provide, in a combined aircraft-automobile, a vehicle simple in structure and having a full-span flap and wing overlapping wings which may be retraced to a position within the body of the vehicle.

Another object is to provide a roadable airplane, compact in size and having for its size sufficient lift surface to assure efficient and safe operations in the air.

A further object of this invention is to provide a half-span warp action spoiler plate aileron which is self-closing and is located in the outer rear area of the wing, and is twisted up out of the wing.

A further object is to provide an aircraft economical to produce and assemble, one sturdy in construction and highly effective in action.

BRIEF DESCRIPTION OF THE FIGURES

These and other objects and advantages will be apparent from the following description when taken in conjunction with the annexed drawings, in which.

DETAILED DESCRIPTION OF THE INVENTION

Figure 1:
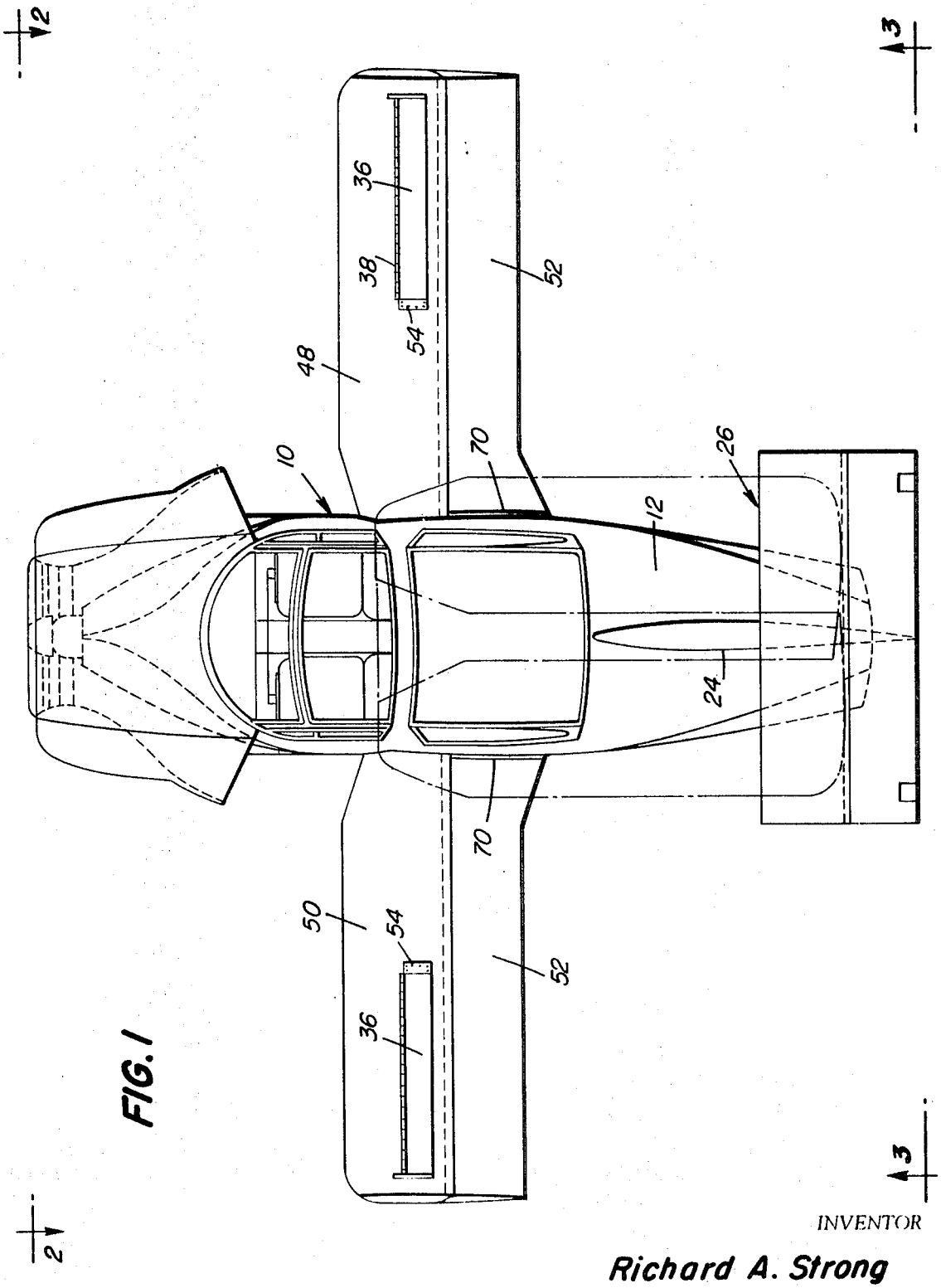
FIG. 1 is a top plan view of the aircraft-automobile, shown with the wings in flight position.

Referring to the drawings in detail, in which like numerals indicate like parts in the several views, the numeral 10 designates generally the aircraft-automobile of the present invention.

The aircraft-automobile 10 includes a body 12 of a conventionally elongated streamlined shape, and superimposed on a chassis 14 having front wheels 16 and 18 and rear wheels 20 and 22.

The front wheels 16 and 18 are steerable in the usual manner of road vehicles and are controlled by suitable mechanisms and steering apparatus not shown here as being part of the invention.

A vertical fin 24 rises from the rearward end of the body 12 and carries on its upper end a tail structure 26 having a horizontal stabilizer air foil 28 and elevator 30.

A vertical stabilizer 32 depends from each of the free ends of the air foil 28. The fin 24 carries on its rearward end a rudder 34. The elevator 30 and the rudder 34 are movable in the manner common to aircraft and the details of the controls for moving the same are not here recited.

Figure 2:
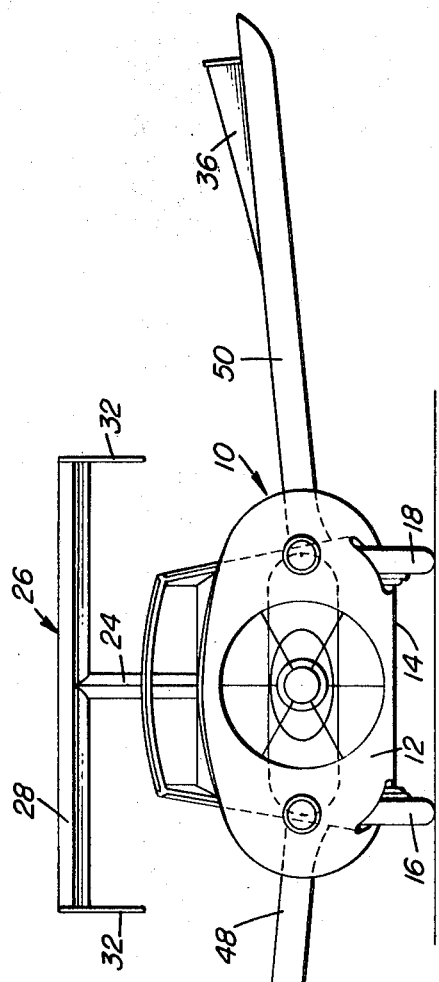
FIG. 2 is a view on line 2—2 of FIG. 1, dotted lines showing the wings and full-span flaps in retracted overlapped nested position.
Figure 3:
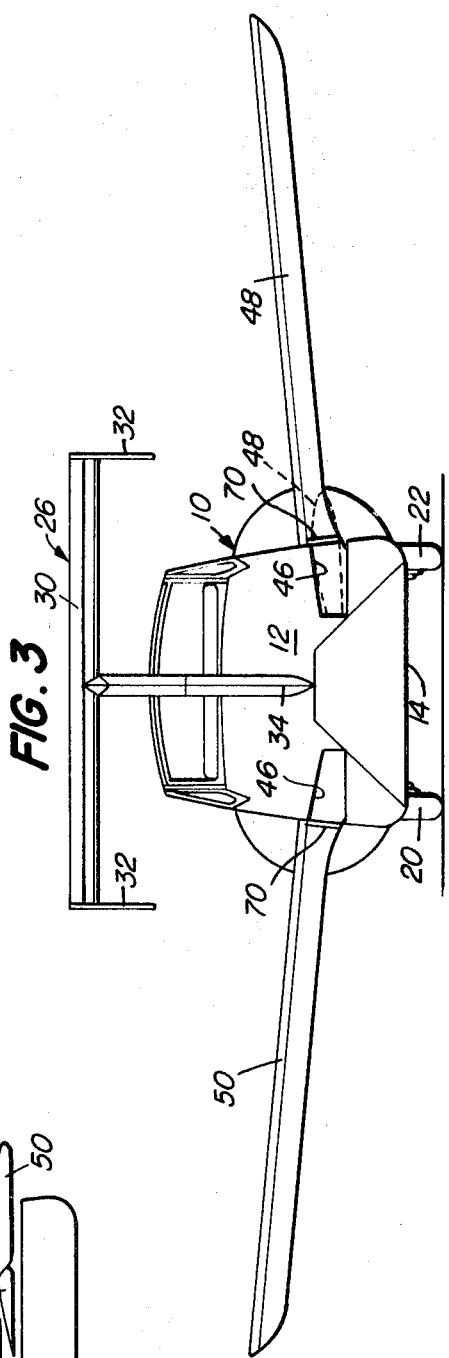
FIG. 3 is a view on line 3—3 of FIG. 1.
Figure 5:
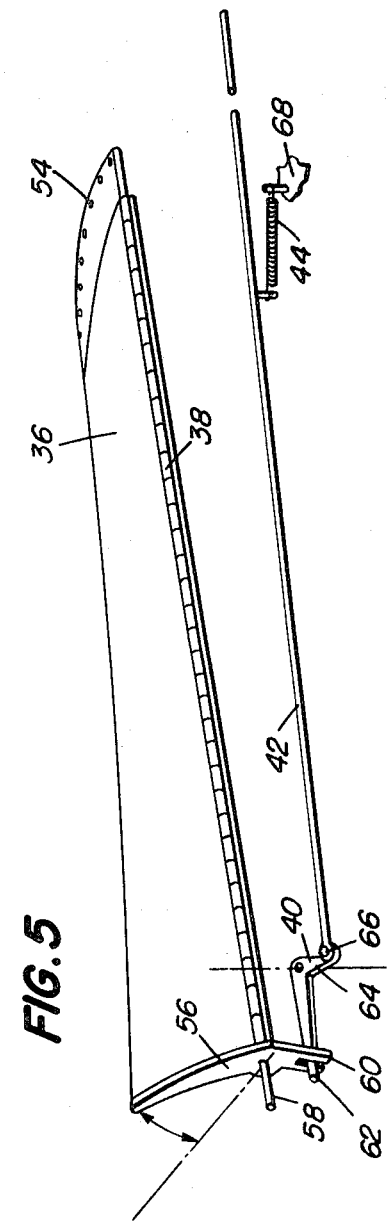
FIG. 5 is a perspective skeletal view of the left wing spoiler aileron.

A feature of the invention is an approximately half-span warp action spoiler plate aileron 36 located on each wing 48 and 50 adjacent the outer rear corner thereof and partially liftable therefrom in operation. If desired, a countersunk depression may be provided in the wing where the aileron is located. As shown in the skeletal view of the left spoiler aileron 36 in FIG. 5, the aileron 36 is pivoted to the wing on its forward edge by a piano hinge 38. The inner end of the aileron 36 is secured to the wing at 54, the outer end of the aileron 36 is secured to a bracket 56 which is pivoted on the piano hinge pin 58 and has a bifurcated arm 60 extending into the wing 48 or 50. One end 62 of a bellcrank lever 40 extends into the bifurcations of the arm 60, the other end 64 is pivoted at 66 to the end of a control pushrod 42, controllable by the pilot of the plane. This control rod 42 is resiliently connected by a spring 44 biased on an internal strut 68 within the wing 48 or 50 urging the aileron into closed position. When the control rod 42 is pushed against the spring 44, it partially lifts the outer rear area of the aileron 36 up out of the aileron slot warping or twisting it as it does so, as seen in FIG. 2, and controllably spoils the lift of the wing when maneuvering the plane.

Figure 6:
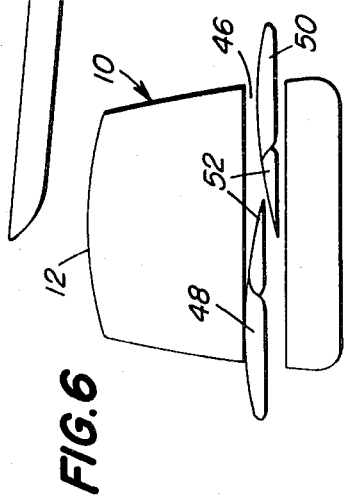
FIG. 6 is a schematic view of a midsection of the fuselage showing the wings in retracted nested position.
Figure 4:
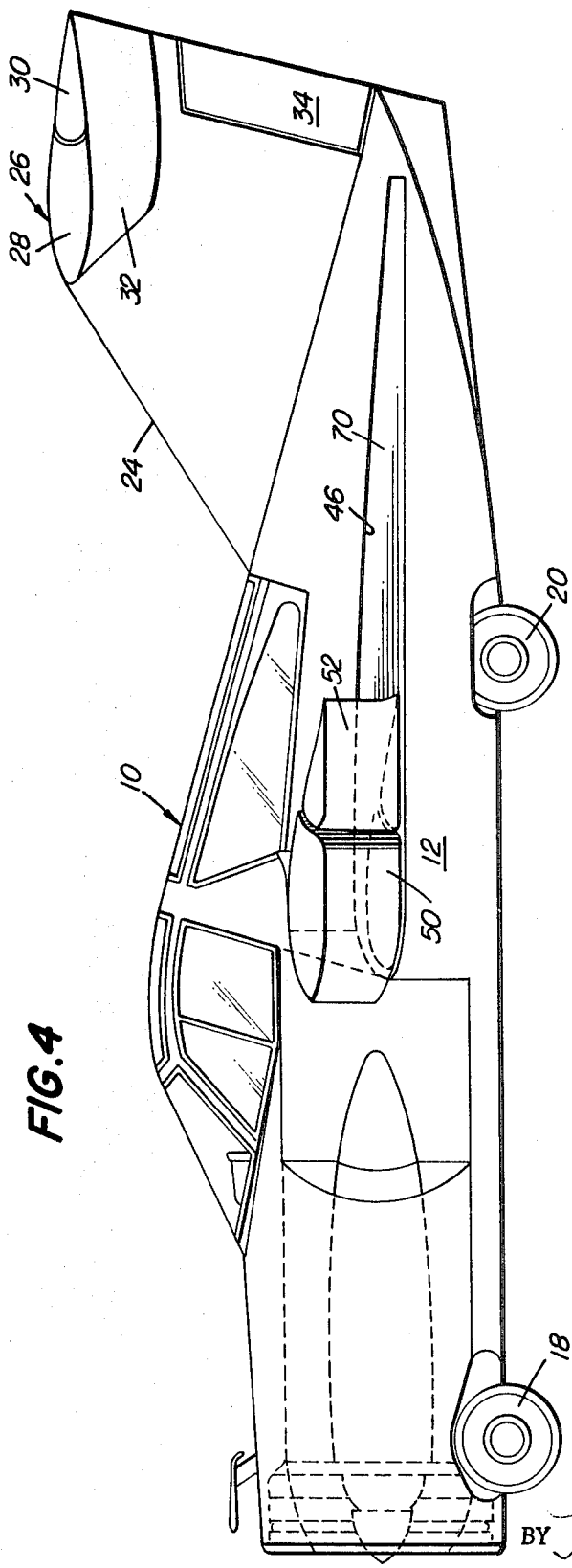
FIG. 4 is a side elevational view.

A further feature of the invention is the provision of a horizontal slot 46 opening out of each side of the body 12 rearwardly of the point of attachment of the wings 48 and 50. The wings 48 and 50, with their flaps 52, are hingedly connected to the body 12 by conventional means (not shown) and are horizontally swingable manually from the extended positions to overlapping nested positions within the slot 46, as shown in FIG. 6. When the wings 48 and 50 are extended for flight, the wing nesting slot 46 is closed along its length on both sides by streamlining covers 70 suitably secured thereover.

The power plant for the aircraft-automobile of the present invention is located within the body 12 as previously described in the aforesaid patent, and is similarly operable. Located on each wing 48 and 50 is the approximately half-span length spoiler aileron 36 which is mounted and controlled as described above. It will be therefore seen that the provision of the slot 46 and the retractable and swinging wings 48 and 50 permits the aircraft-automobile of the present invention to assume the narrowest form possible for road travel and with the wings 48 and 50 retracted into the slot 46, the wings 48 and 50 are protected from the wind and do not present a hazard to normal driving as they would if folded upwardly or folded against the body 12 as previously described in the aforesaid patent. In the drawings, like numbers refer to like parts, and for the purposes of explication, set forth below are the numbered parts of the improved Combined Airplane And Automobile:

10 combined airplane and automobile
12 body
14 chassis
16, 18, 20, 22 wheels
24 tail fin
26 tail structure
28 horizontal stabilizer air foil
30 elevator
32 horizontal stabilizer
34 rudder
36 short spoiler aileron in each wing
38 piano hinge
40 crank arm wing flap lever
42 lever control rod
44 biasing spring
46 body slot to receive and overlap wings and flaps
48, 50 wings
52 flap on each wing
54 warp action spoiler plate aileron end secured to wing 48 or 50
56 bracket on outer end of aileron 36
58 hinge pin of piano hinge 38
60 bifurcated arm of bracket 56
62 end of bellcrank lever 40 in 60
64 other end of 40

66 pivot of 64 to 42
68 internal strut of wing 48 or 50
70 body slot covers Although this invention has been described in considerable detail, such description is intended as being illustrative rather than limiting, since the invention may be variously embodied.

Having thus set forth and disclosed the nature of this invention, what is claimed is:

1. In a combined airplane and automobile (10) including an elongated body (12), wheels (16, 18, 20, 22) extending beneath said body (12) and adapted to support said body (12) on a ground surface, and a tail structure (26) mounted on said body (12), said tail structure (26) including a rudder (34) and an elevator (30), a wing (48 or 50) extending outwardly from each side of said body (12) for horizontally swinging from the outwardly extending position to a position rearwardly of said body portion and substantially parallel to said body, each said wing (48,50) having an approximately half-span warp action spoiler plate aileron (36) located thereon adjacent the outer, rear edge of said wing, and piano hinge means pivotally securing the forward edge of said aileron (36) to said wing, the inner end of said aileron being secured (54) to said wing (48, 50).

2. The combination of claim 1, and control means 40, 42 56) connected to said aileron at the outer end thereof for lifting the outer rear area of said aileron (36) above the adjacent wing area.

3. The combination of claim 2, said control means comprising a bracket (56) secured to the outer end of said aileron (36) and pivoted on the hinge pin, a bifurcated arm (60) extending from said bracket (56) into said wing (48, 50), a bellcrank lever (40) having one end (62) extending into the bracket arm bifurcation, and a control rod (42) pivoted (66) to the other end (64) of said bellcrank lever (40).

4. The combination of claim 3, and means resiliently urging said control rod (42) to lower said aileron (36) to said wing comprising a spring (44) biased between said control rod (42) and an internal strut (68) of said wing.

Applicant is aware of the following pertinent prior references, as the result of a preliminary search:

| Fulton, et al. | 2,430,869 |
| Fulton, et al. | 2,434,068 |
| Fulton, et al. | 2,457,884 |
| Fulton, et al. | 2,474,974 |
| Fulton, et al. | 2,494,547 |
| Fulton, et al. | 2,509,095 |
| Fulton, et al. | 2,509,096 |
| Fulton, et al. | 2,512,928 |
| Fulton, et al. | 2,532,159 |
| Fulton, et al. | 2,533,925 |
| Smith | 2,539,489 |
| Noringer | 2,713,465 |
| Dodd | 3,012,737 |
| Helmke, et al. | 3,017,137 |
| Marten | 3,029,042 |
| Zuck | 3,056,564 |
| Einarrson | 3,090,581 |
| Postlson | 3,265,324 |
| Schertz | 3,371,886 |

5. In an airplane wing, the combination therewith of an approximately half-span warp action spoiler plate aileron (36) located thereon adjacent the outer, rear edge of said wing (48 or 50), hinge means (38) securing the forward edge of said aileron to said wing, the inner end of said aileron being secured (54) to said wing.

6. The combination of claim 5, and control means (40, 42, 56) connected to said aileron at the outer end thereof for lifting the outer rear area of said aileron (36) above the adjacent wing area.

7. The combination of claim 6, said control means comprising a bracket (56) secured to the outer end of said aileron (36) and pivoted on the hinge pin (58) of said hinge means (38), a bifurcated arm (60) extending from said bracket (56) into said wing, a bellcrank lever (40) having one end (62) extending into the bracket arm bifurcation, and a control rod (42) pivoted (66) to the other end (64) of said bellcrank lever (40).

8. The combination of claim 7, and means resiliently urging said control rod (42) to lower said aileron (36) to said wing.

9. The combination of claim 8, said resilient means comprising a spring biased between said control rod (42) and an internal strut (68) of said wing.

UNITED STATES PATENT OFFICE
CERTIFICATE OF CORRECTION

Patent No. 3,612,440       Dated October 12, 1971

Inventor(s) Richard A. Strong

It is certified that error appears in the above-identified patent and that said Letters Patent are hereby corrected as shown below:

On the cover sheet [72] "6106 Hope Drive, Washington, D. C. 20031" should read -- Air Force Institute of Technology Wright-Patterson Air Force Base, Dayton, Ohio 45433 --. Column 2, line 46, "In the drawings," should start a new paragraph. Column 3 line 3. "Although this invention" should start a new paragraph": column 3 line 40, beginning with "Applicant is aware" cancel all to and including "Schertz 3,371,886" in column 4, line 17, and insert the same at the end of the claims.

Signed and sealed this 6th day of March 1973.

(SEAL)
Attest

EDWARD M. FLETCHER, JR.
Attesting Officer

ROBERT GOTTSCHALK
Commissioner of Patents